(12) United States Patent
Ben-Reuven

(10) Patent No.: US 7,899,819 B2
(45) Date of Patent: Mar. 1, 2011

(54) FINANCIAL LINE DATA-BASE

(76) Inventor: Ehud Ben-Reuven, New York, NY (US)

( * ) Notice: Subject to any disclaimer, the term of this patent is extended or adjusted under 35 U.S.C. 154(b) by 442 days.

(21) Appl. No.: 12/070,408

(22) Filed: Feb. 19, 2008

(65) Prior Publication Data

US 2008/0215619 A1 Sep. 4, 2008

Related U.S. Application Data

(60) Provisional application No. 60/904,399, filed on Mar. 2, 2007.

(51) Int. Cl.
*G06F 7/00* (2006.01)
*G06F 17/30* (2006.01)

(52) U.S. Cl. ........... 707/731; 707/736; 707/756; 705/36; 705/35; 715/212

(58) Field of Classification Search ............ 707/731, 707/736, 756; 705/35, 36, 34, 10, 30; 715/503, 715/234, 212
See application file for complete search history.

(56) References Cited

U.S. PATENT DOCUMENTS

| | | | | |
|---|---|---|---|---|
| 4,053,871 | A * | 10/1977 | Vidalin et al. | 707/999.003 |
| 6,161,107 | A * | 12/2000 | Stern | 707/756 |
| 6,490,578 | B1 * | 12/2002 | Burkhard | 707/999.003 |
| 7,013,307 | B2 * | 3/2006 | Bays et al. | 707/741 |
| 7,047,488 | B2 * | 5/2006 | Ingersoll et al. | 715/235 |
| 7,165,044 | B1 * | 1/2007 | Chaffee | 705/37 |
| 7,249,328 | B1 * | 7/2007 | Davis | 715/853 |
| 7,424,668 | B2 * | 9/2008 | DeSpain | 715/212 |
| 7,505,989 | B2 * | 3/2009 | Gardner et al. | 705/30 |
| 7,685,152 | B2 * | 3/2010 | Chivukula et al. | 707/10 |
| 2002/0042750 | A1 * | 4/2002 | Morrison | 705/26 |
| 2002/0049749 | A1 * | 4/2002 | Helgeson et al. | 707/3 |
| 2002/0099633 | A1 * | 7/2002 | Bray | 705/35 |
| 2002/0156710 | A1 * | 10/2002 | Ryder | 705/35 |
| 2003/0074372 | A1 * | 4/2003 | Barchi et al. | 707/104.1 |
| 2003/0126058 | A1 * | 7/2003 | Hunter | 705/36 |
| 2004/0019558 | A1 * | 1/2004 | McDonald et al. | 705/38 |
| 2004/0054690 | A1 * | 3/2004 | Hillerbrand et al. | 707/104.1 |
| 2004/0162641 | A1 * | 8/2004 | Suzuki et al. | 700/265 |
| 2005/0015397 | A1 * | 1/2005 | Abineri et al. | 707/101 |
| 2005/0033768 | A1 * | 2/2005 | Sayers et al. | 707/104.1 |
| 2005/0144129 | A1 * | 6/2005 | Coolman et al. | 705/40 |
| 2005/0154769 | A1 * | 7/2005 | Eckart et al. | 707/201 |

(Continued)

OTHER PUBLICATIONS

Elson et al.—"Tinker: A Tool for Designing Data-Centric Sensor Networks"—Information processing in sensor Networks, 2006. IPSN 2006, Apr. 19-21, 2006, Nashville, Tennessee (pp. 350-357).*

(Continued)

*Primary Examiner* — John E Breene
*Assistant Examiner* — Anh Ly

(57) ABSTRACT

A computerized method for managing data performed in a computer system. The data is stored in a data base including flat lines. Each of the flat lines includes values of the data and tags associated with the values forming tag-value pairs. The flat lines are scanned and an object of a class is created. The class specifies a subset including one or more tags selected from the tags of the flat lines. The flat line points to the object if a portion of the tag-value pairs of the flat line includes all the tags of the subset. When the flat line contains multiple alternative ways, through the subset(s) of tags or through different tag-value pairs, of pointing to the object of the class, then the object as individually identified by the alternative ways is taken to be the same object.

1 Claim, 4 Drawing Sheets

U.S. PATENT DOCUMENTS

| | | |
|---|---|---|
| 2005/0192830 A1* | 9/2005 | Pugh et al. .................. 705/1 |
| 2005/0198042 A1* | 9/2005 | Davis ....................... 707/10 |
| 2005/0210000 A1* | 9/2005 | Michard ...................... 707/3 |
| 2005/0222931 A1* | 10/2005 | Mamou et al. ............... 705/35 |
| 2006/0117246 A1* | 6/2006 | Bauchot et al. ............. 715/503 |
| 2006/0277227 A1* | 12/2006 | Britton et al. .............. 707/201 |
| 2006/0288267 A1* | 12/2006 | DeSpain .................... 715/503 |
| 2007/0022025 A1* | 1/2007 | Litman et al. ............... 705/30 |
| 2007/0033104 A1* | 2/2007 | Collins et al. ............... 705/14 |
| 2007/0050698 A1* | 3/2007 | Chopin et al. .............. 715/503 |
| 2007/0078877 A1* | 4/2007 | Ungar et al. ................ 707/101 |
| 2007/0162504 A1* | 7/2007 | Chivukula et al. ......... 707/104.1 |
| 2008/0005006 A1* | 1/2008 | Tritt et al. ................ 705/36 R |
| 2008/0140547 A1* | 6/2008 | Murphy et al. ............... 705/30 |
| 2008/0177726 A1* | 7/2008 | Forbes et al. .................. 707/5 |
| 2009/0077094 A1* | 3/2009 | Bodain ....................... 707/10 |
| 2009/0089657 A1* | 4/2009 | Davis ....................... 715/234 |
| 2009/0094170 A1* | 4/2009 | Mohn ...................... 705/36 T |
| 2009/0265362 A1* | 10/2009 | Parsons et al. ................ 707/10 |

OTHER PUBLICATIONS

Singh et al.—"Security Policy Analysis Using Deductive Spreadsheets"—Workshop on Formal Methods in Security Engineering, Proceedings of the 2007 (FMSE'07 Nov. 2, 2007, ACM, Fairfax, Virginia, USA (pp. 42-50).*

Brock et al.—"An Overview of the M Language"—The data center MT-DataCenter-WH-009, Jan. 12, 2006, Massachusetts Institute of Technology (pp. 1-11).*

Elliotte Rusty Harold, "Processing XML with Java(TM): A Guide to SAX, DOM, JDOM, JAXP, and TrAX", www.cafeconleche.org/books/xmljava/chapters/ch04.html, Nov. 2002, p. 1.

Time Berners-Lee, "Primer: Getting into RDF & Semantic Web using N3 ", www.w3.org/2000/10/swap/Primer, 2005, section "Subject, verb and object", pp. 1-2.

* cited by examiner

FINANCIAL LINE DATA-BASE

CROSS REFERENCE TO RELATED APPLICATIONS

This application claims the benefit from U.S. provisional application 60/904,399 filed Mar. 2, 2007 by the present inventor. U.S. provisional application 60/904,399 is included herein by reference for all purposes as if entirely set forth herein.

FIELD AND BACKGROUND OF THE INVENTION

The present invention relates to management of data and is particularly useful for the management of financial data from disparate sources and in different formats from different accounts, assets and investments.

Managing personal financial information includes organizing a flood of information from various incoming statements and in various formats including: bank statements, quotes, notes of phone calls with a broker, notes of new understandings of the financial portfolios, etc. Management of personal data is conventionally performed with the use of a spreadsheet application program. First, a decision is made regarding how to present the data in spreadsheet tables and then data is entered into the spreadsheet tables from each incoming statement. Alternatively the statements are available in an electronic format and an existing computer application is used which imports the electronic statements assuming the format is supported by the application. Otherwise the data may be input manually into the application. Occasionally, the underlying model, e.g. the structure of the spreadsheet tables, is changed requiring a modification of the spreadsheet table structure. If a computer application is being used, migrating to a newer version of the application or to a different application typically requires a change in the underlying model. A model change is also needed for instance whenever there is a change in assumptions: e.g. change in tax laws, change in personal tax situation or whenever new financial information needs to be represented in the model. The situation is further complicated when working with tax systems simultaneously from several countries. Tax rules change and as a result the data model needs to change. All tools assumes there is just one truth about the data which is called the "consolidated" information. The user is required to perform the endless task of manually verifying the consolidated information at any point in time.

A change of model may also be required whenever a new type of statement is input, even if the new statement contains just one new field not previously considered in the model. Changing the model, e.g. spreadsheet tables currently in use and the relations between them, can be a daunting task: existing data requiring restructuring, and import tools have to be modified.

Commercial financial software packages (e.g. Intuit Quicken or QuickBooks, Microsoft Money or gnucash) are designed to manage checking accounts especially if they are held in a US bank or perform bookkeeping. These packages typically have limited functionality for managing investments. An import tool is required for importing information from each statement each in the appropriate format, e.g. spreadsheet, comma separated values (CSV). Each format requires bank specific processing depending on the financial institution. (CSV is one implementation of a delimited text file, which uses a comma to separate values.) Even if the financial institution exports information in a well defined file format (e.g., Open Financial Exchange, OFX) the commercial packages are not guaranteed to handle the disparate formats correctly if at all.

OFX is a data-stream format for exchanging financial information. The OFX standard was designed as a unified technical specification which allows for bank and application specific extensions. Few banks support OFX as a vendor-independent format, preferring to support a narrow subset used only by a specific financial software application, such as Quicken.

When using an existing financial management application it is hoped that the required model currently in use will be supported in future versions and support for the computer application in use will not be discontinued. In existing software packages, questions about the financial data, are either programmed already, or if not hopefully support will be available in the next version. Other software packages are available to analyze current investment portfolio and give investment suggestions for the future but they are not particularly suitable for collecting information, looking back at history, or just showing in great detail the current investment position. Some banks supply Web tools that show your current portfolio but they lack information from other financial institutions without generating exposure between banks.

There is thus a need for, and it would be highly advantageous to have a method of managing, consolidating and analyzing information, such as personal financial information and investments which comes from disparate sources.

SUMMARY OF THE INVENTION

According to the present invention there is provided a computerized method for managing data performed in a computer system. The data is stored in a data base including flat lines. Each of the flat lines includes values of the data and tags associated with the values forming tag-value pairs. The flat lines are scanned and an object of a class is created. The class is specified in a user defined model. The class specifies a subset including one or more tags selected from the tags of the flat lines. A flat line points to the object if a portion of the tag-value pairs of the flat line includes all the tags of the subset. When the flat line contains multiple alternative ways, through the subset(s) of tags or through different tag-value pairs, of pointing to the object of the class, then the object as individually identified by the alternative ways is taken to be the same object.

Typically, multiple statements including the data are input in two or more different formats and the data are converted into flat lines in the data base. The data of the data base are invariant with changing the order of the tag-values pairs within any flat line of the data base. The class and the object are typically added to all the flat lines in which the object is identified. A second class preferably specifies a second subset of tags to be used as an identifier for a second object of the second class. One of the tags of the second subset is the name of the (first) class and the (first) object is the value associated with the one tag of the second subset.

The scan is preferably repeated until no additional objects are created. A query on the data base is optionally performed based on the tag over the flat lines. The query includes at least one triplet consisting of a tag name, a comparison operator and a value. When the query includes multiple triplets, a logical OR is assumed for all the triplets that have the same tag name and comparison operator; and a logical AND is assumed between all other of the triplets. When scanning, if multiple objects are created when only one of the objects is desired by a user, thereby causing a conflict or ambiguity in the data, additional flat lines are preferably inserted into the data base for resolving the conflict or ambiguity. The scanning is typically performed based on a model defined by the user and when the user changes the model to another model, the objects are created according to the second model by scanning again the flat lines of the database. When multiple classes are specified, a single flat line points to at most one object for each class specified.

A portion of the tags are a set of attributes of the object as defined in said class. The object is created by (i) during the scanning, extracting all of the attributes which are found in the flat lines that are pointing to the object, (ii) For each of the attributes found in the line(s), all values that appear in the line(s) are appended to the attribute while verifying that each value assigned appears no more than once; and (iii) the name of the class is added as another tag to the line(s) and assign said object as a value to said other tag. A tag in the set of attributes may behave as a filter by testing if the line(s) match the filter. The values assigned to the attribute in all flat-lines identifying the object are optionally cached in an object database operatively connected to said database. The caching is performed by either modifying a previously cached value or by caching a new value.

According to the present invention there is provided a computerized method for managing financial data performed in a computer system. The data are converted into a data base including multiple flat lines. Each of the flat lines includes values of the data and tags associated with the values, to form multiple tag-value pairs and at least one of the tags is associated with at least two values of the data. The data of the data base are invariant with changing the order of the tag-values pairs within any flat line of the data base. The flat lines are scanned, thereby creating an object of a class. The class specifies a subset including one or more tags selected from the tags. The flat line points to the object if a portion of the tag-value pairs of the flat line includes all the tags of the subset. At least two of the flat lines preferably have at least one different tag. Statements including the financial data are input in at least two different formats from different financial institutions including investment brokers and banks.

According to the present invention there is provided a computer readable medium by a machine, tangibly embodying a program of instructions executable by the machine to perform a method for managing data, the method being performed in a computer system comprising the steps as disclosed herein.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
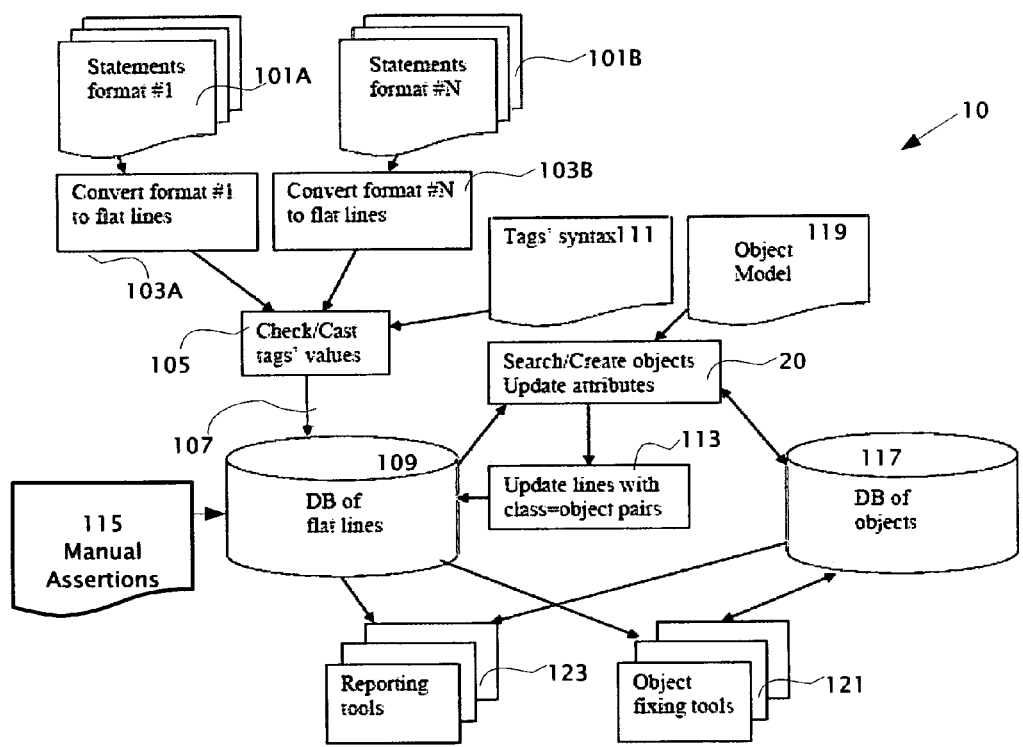
FIG. 1 is an architecture diagram of a system for managing financial information, according to an embodiment of the present invention.

The present invention is of a computerized method for managing information. Specifically, the method includes converting all incoming information from multiple sources of financial data into a flat data structure, and using the flat data structure to resolve conflicts and ambiguities in the financial data, perform queries and build objects from previously determined classes of objects defined in a user specified model.

According to embodiments of the present invention disclosed herein is an innovative approach wherein the information of the incoming statements is given and invariant. The input information is converted into an intermediate data structure including "flat lines" which include a representation of the all information from all incoming statements. The structure of the flat lines is preferably simple so that the flat line data structure can be read and edited manually. After the flat line intermediate data structure is created, the flat lines are scanned in order to create objects according to a model. If the model is modified, the scanning process is performed again, and based on the new model, new data objects are created. Hence, the building of the model is separate from the representation of the statements: flat lines remain invariant as the incoming statements they represent are invariant and there is no need for a migration process whenever the model is changed.

According to embodiments of the present invention if there are conflicts or ambiguities between any of incoming statements, the conversion into flat lines of the incoming statements is performed while the resolution of the conflicts and/or ambiguities is deferred to the object creation process. In prior art methods, e.g. spreadsheets, computer applications, a consolidation process needs to be performed while inputting information, in which a single "truth" is selected from the ambiguous or conflicting data and the "single truth" is entered in the spreadsheet tables or input into the computer application.

The use of flat lines is simple to understand. As a result it is easy to:
  formulate new queries needed for answering unexpected questions.
  add manual lines that add more facts. For example, after a phone call with your broker you have realized that one of the assets should be classified as a stock and you can immediately save this newly gained knowledge by writing a flat line that is added to the data-base.
  develop tools for importing new input file formats.
The object based model is easy to follow and modify it is therefore easy to:
  follow how objects were formed from the lines.
  experiment with new model structure.
  experiment with new tools that process the data-base content.

It should be noted, that although the discussion herein relates to management of financial information from multiple sources, e.g. bank statements, the present invention may, by non-limiting example, alternatively be configured as well for management of other types of information. A few examples of different types of information which may be unified by embodiments of the present invention include: scientific research data, environmental data, geological data, meteorological data, pharmacological data, epidemiological data, medical statistics, health care statistics, economic statistics, educational statistics, anthropological data, sociological data, zoological data, military data, from different researchers, organizations, countries and/or continents.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including mobile telephones, PDA's, pagers, hand-held devices, laptop computers, personal computers, multi-processor systems, microprocessor-based or programmable consumer electronics, network PCs, minicomputers, mainframe computers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

The principles and operation of a computerized method for managing financial information, according to the present invention, may be better understood with reference to the drawings and the accompanying description.

Figure 4:
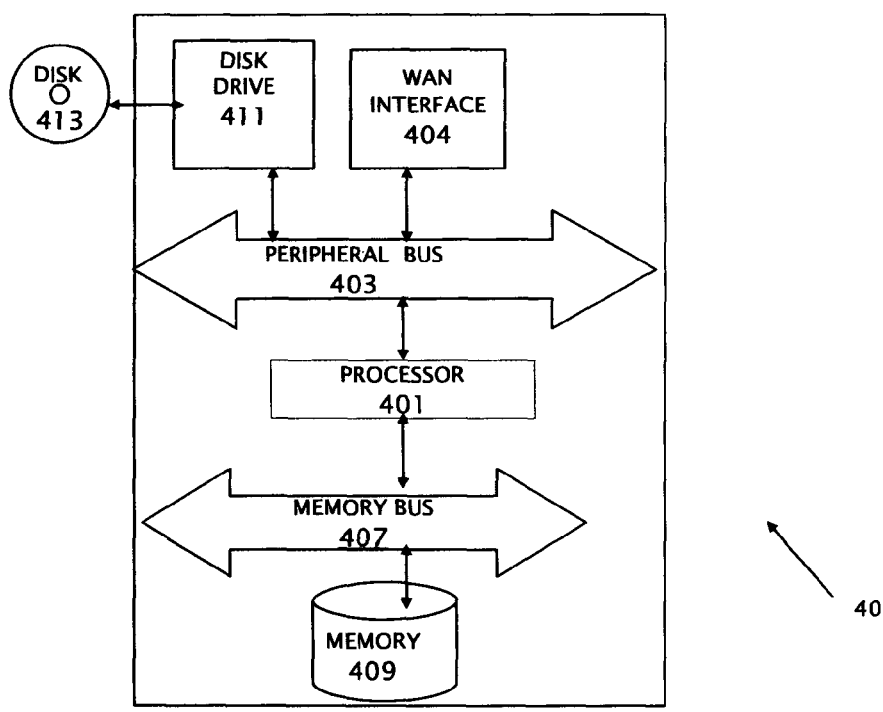
FIG. 4 is a simplified drawing of a prior art computer system.

Reference is now made to FIG. 4 which illustrates a computer system 40, which includes a processor 401, a storage mechanism including a memory bus 407 to store information in memory 409. Computer system 40 further includes a data input mechanism 411, e.g. disk drive from a computer readable medium 413, e.g. optical disk. Data input mechanism 411 is operatively connected to processor 401 with a peripheral bus 403. Optionally, a network interface 404 optionally connects computer system 40 to a computer network.

In this description and in the following claims, a "network" is defined as any architecture where two or more computer systems may exchange data. Exchanged data may be in the form of electrical signals that are meaningful to the two or more computer systems. When data is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

Reference is now made to FIG. 1, a drawing illustrating system architecture and flow of an algorithm 10 for managing financial information from multiple sources, according to an embodiment of the present invention. Typically, financial information is available in different formats from different financial institutions. Algorithm 10 starts with different statements 101A and 101B input to the algorithm respectively in different formats.

Flat Lines

CSV file statement 101A is downloaded as follows from a bank and saved under the file name: 'Bnk1-061012.csv':

```
Account#,12A-32243
Description,Cusip#,Quantity,NAV/Price,Price As of,Value
FORD MOTOR CO,#345370860000,90.2,8.27,10/11/2006,745.954
MICROSOFT CP,#594918104000,29.4,27.54,10/11/2006,809.676
Cash Account Balance,,,,,0,
Total*,,,,1555.63,
02:25:44 PM Thu 12 October 2006,,,,,,
```

The structure of the data of the above CSV file is represented in a structured table as follows:

| Account# Description | 12A-32243 Cusip# | Quantity | NAV/ Price | Price As of | Value |
|---|---|---|---|---|---|
| FORD MOTOR CO | #345370860000 | 90.2 | 8.27 | 10/11/2006 | 745.954 |
| MICROSOFT CP | #594918104000 | 29.4 | 27.54 | 10/11/2006 | 809.676 |
| Cash Account Balance | | | | | 0 |
| Total* 02:25:44 PM Thu 12 Oct. 2006 | | | | | 1555.63 |

File Bnk1-061012.csv has a structure to that is unique to the bank and in addition the values have a syntax which may be unique. For example, the Account# relates to the entire file and the dates are in US format. The first step in processing this file is to convert (step 103) the structure of the information contained in Bnk1-061012.csv into "flat lines" and normalize the syntax being used. For example:

---

ACCTID=12A-32243 SECNAME="FORD MOTOR CO" SECID=CUSIP=34537086 UNITS=90.2 \
   UNITPRICE=8.27 CURRENCY=USD DTASOF=20061011 FILE=Bnk1-061012
ACCTID=12A-32243 SECNAME="MICROSOFT CP" SECID=CUSIP=594918104 UNITS=29.4 \
   UNITPRICE=27.54 CURRENCY=USD DTASOF=20061011 FILE=Bnk1-061012
ACCTID=12A-32243 SECID=CASH=USD UNITS=0 \
   UNITPRICE=1 CURRENCY=USD DTASOF=20061012142544 FILE=Bnk1-061012

---

(The symbol "\" is used to indicate that the present line continues although presented as folded in order to fit on a page.) At this point the original structure (e.g row, column) of the file or table is removed. Each line is structure less and stands for itself, i.e. the lines are "flat", without referring to the structure of original file 101. The tabular structure of file 101 in which each column has a name and a value appears in a row under a certain column is replaced with tag-value pairs, the tag name being a standard name (e.g. ACCTID,SECNAME,UNITS) associated with the column name. The association is represented in the above example with a symbol "=". Tag syntax 111 of values associated with the tags is standardized and in step 105 the syntax of the data from files 101 is checked against standard syntax 111 and if different the values are cast into standard syntax 111. The flat lines are loaded (step 107) into a data-base 109 with lines arriving from other statements 101A, 101B from other sources in multiple formats.

For example a statement 101B made a month later is reduced to the following three flat lines:

---

ACCTID=12A-32243 SECNAME="FORD MOTOR CO"
SECID=CUSIP=34537086 UNITS=90.2 \
UNITPRICE=8.58 CURRENCY=USD
DTASOF=20061110 FILE=Bnk1-061112
ACCTID=12A-32243 SECNAME="MICROSOFT CP"
SECID=CUSIP=594918104 UNITS=29.4 \
UNITPRICE=29.24 CURRENCY=USD DTASOF=20061110
FILE=Bnk1-061112 ACCTID=12A-32243 SECID=CASH=USD
UNITS=0 \UNITPRICE=1 CURRENCY=USD
DTASOF=20061110 FILE=Bnk1-061112

---

Queries

Queries may be performed once the information from the two sources are combined into a single data-base 109 of flat-lines.

For example, the following query:
DTASOF!PRINT UNITPRICE!PRINT SECID=CUSIP=34537086
gives a history of prices for Ford as follows:
DTASOF=20061011 UNITPRICE=8.27
DTASOF=20061110 UNITPRICE=8.58
and the query: DTASOF!MAX UNITPRICE!PRINT SECID=CUSIP=34537086 returns the latest value. In the examples of queries above, lines are only filtered in which the SECID tag received the value CUSIP=34537086. We can make the filtering more specific and query for lines in which the price is above 8.50:
UNITPRICE!PRINT SECID=CUSIP=34537086 UNITPRICE>8.50

In this query an AND operation is performed on the different tags CUSIP and UNITPRICE. In the following example, we want to list all the SECID values we have in our data base:
SECID!PRINT SECID!SORT SECID!UNIQUE The pair SECID!UNIQUE cause all lines containing the same SECID value to be printed together in one larger line. This is done to avoid repeated prints of the same value (with the SECID!PRINT pair.) The task of SECID!SORT is to sort the printout according to the value assigned to SECID. The combined pairs SECID!UNIQUE SECID!PRINT are so common that they can be shortened into one pair: SECID!GET.

Next we want to get a sorted list of the names of assets for which we had non zero units in the third quarter of 2006:
SECID!PRINT SECID!SORT SECID!UNIQUE\
DTASOF>=20061001 DTASOF<20070101 UNITS>0

An AND operation is performed on DTASOF because it appears with two different comparison operators (>= and <).

Each of the assets may be classified into asset classes (not to be confused with object class) by adding (step 115) lines to database 109 as in the example below:
SECID=CUSIP=34537086     ASSETCLASS=STOCK
   FILE=manual
SECID=CUSIP=594918104     ASSETCLASS=STOCK
   FILE=manual Prior to this manual work we may want to check if we haven't forgotten to classify any asset. The query: SECID!GET ASSETCLASS? prints all the SECID for which we assigned some value to ASSETCLASS. We can get a list of all assets that are either stocks or bonds or both with the following query:
SECID!PRINT SECID!SORT ASSETCLASS=STOCK ASSETCLASS=BOND In this query the tag (ASSETCLASS) has multiple values and a match with a line is performed if one of the values assigned to the tag in the query is the same as one of the values assigned to the same tag in the line. In a previous example we have seen that an AND is performed on all different tags in the query and now we see that an OR is performed on all values assigned to the same tag with the same comparison operator.

Objects

What will happen if we also download price information in a file 101B from finance.yahoo.com. The web site information is converted (step 103) into flat lines with the assumptions CURRENCY=USD and FILE=yahoo as follows in the example below:
SECID=TICKER=MSFT DTASOF=20070131 UNITPRICE=30.86 CURRENCY=USD FILE=yahoo
SECID=TICKER=F DTASOF=20070131 UNITPRICE=8.13 CURRENCY=USD FILE=yahoo Note that the same asset (e.g. Microsoft shares) has different tag-value identifiers, SECID=TICKER=MSFT and CUSIP=594918104 respectively from input statement 101B and 101A. In order to assert that the different identifiers are equivalent, the following lines are added (step 115) manually to data base 109:

SECID=TICKER=MSFT    SECID=CUSIP=594918104
    FILE=manual
SECID=TICKER=F       SECID=CUSIP=34537086
    FILE=manual We want to identify each Asset as an object that is identified by one or more keys. A new class of objects called Asset is defined within the object model 119 in the example below. Objects from class Asset are identified using the SECID tag or you can say that the SECID tag is a key to objects from class Asset:

class Asset(Obj):
keys=[['SECID']]

An engine is run that creates (step 20) objects based on the above definition of Asset and identifies different SECID values as referring to the same Asset. After running object model 119 through engine 20, the objects are built and stored in object database 117. The building of objects from lines of database 109 is made with the assumption that a single line can point to at most one object from a given class. If a single line has more than one key to the same class of objects then it is assumed that the different keys point to one object of the same class. The following query is performed to retrieve all dates/prices:

DTASOF!PRINT    UNITPRICE!PRINT
    Asset={SECID=TICKER=F}

The query works because it is assumed that each line includes all objects the query is pointed to. An object, e.g. of class Asset, may also be represented as a tag-value pair where the tag name is the class of the object, e.g. Asset, and the value surrounded with { . . . } is again a tag-value pair which forms a key to the object of the class. Using Asset={SECID=CUSIP=34537086} would give the same results, since both keys point to the same object.

You may be interested in how many shares of MSFT you are holding in a specific bank account:

DTASOF!MAX  UNITS!PRINT  ACCTID=12A-32243
    Asset={SECID=TICKER=MSFT}

The query mechanism performs a logical AND operation on the match of each tag-value in the query. It then looks for the line with the maximal DTASOF and prints the value of UNITS. Another way of looking at the AND in the above query is to say that we are looking for a Holding object that is identified by a key made from a set of two tags: ACCTID and Asset:

class Holding(Obj):
keys=[['ACCTID','Asset']]
and the same query can now look like:
DTASOF!MAX  UNITS!PRINT  Holding={ACCID=12A-32243 Asset={SECID=TICKER=MSFT}}

In the class definition of Holding several features are introduced:

- A single key to an object can be made from more than one tag (ACCTID and Asset). The order of the tags in the key is not important but the value assigned to them is important. The key must contain both tags and as we have seen before, in the key, one value is assigned to each tag, but a single object may have multiple keys pointing to it and in each such key the same tag may receive a different value
- A tag used by the key can be another class and the value, assigned to this tag, will be an instance of that class.

As another example, we may give a unique index HIDX for each holding:
class Holding(Obj):
keys=[['HIDX'],['ACCTID','Asset']]

In order to add the assertion that the two keys above are referring to the same object the manual line:

HIDX=12 ACCTID=12A-32243 SECID=TICKER=MSFT
    FILE=manual is added (step 115) to database 109 and run through process 20. Alternatively the following manual line could have been used:

HIDX=12 ACCTID=12A-32243 Asset=SECID=594918104

In this example we see that an object's key can be made by more than one set of tags. The same object of class Holding is both referred to with two tags: ACCTID=12A-32243 Asset=SECID=TICKER=MSFT or ACCTID=12A-32243 Asset=SECID=594918104 or it can be referred to using a key made with one tag: HIDX=12. Armed with this new information the same query can now look like:

DTASOF!MAX UNITS!PRINT Holding={HIDX=12}

Figure 2:
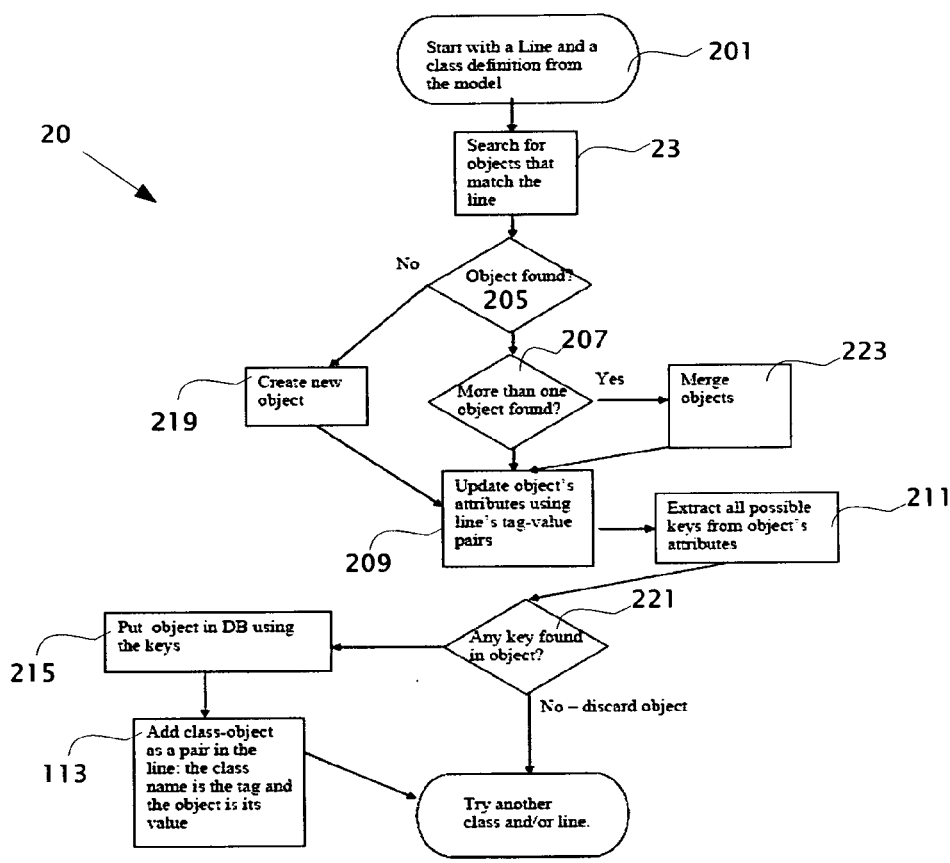
FIG. 2 is a flow diagram illustrating an algorithm, according to an embodiment of the present invention for creating or updating objects and adding the objects to the lines of the database.

Reference is now made to FIG. 2, a flow diagram illustrating an algorithm 20, according to an embodiment of the present invention for creating or updating (step 20 in FIG. 1) objects and adding (step 113) the objects to the lines of database 109 (by using the class name as the tag and the object as its value.) The lines of database 109 point to objects using keys that are the value assigned to set of tags. Several lines of database 109 are grouped as belonging to one object. Each tag appearing in any of these lines is an attribute of the object. In the previous example, process 20 begins with the class definition:

class Holding(Obj):
keys=[['HIDX'],['ACCTID','Asset']]

In step 23, database 109 is searched for objects that match the lines, for example, the manual line: HIDX=12 ACCTID=12A-32243 SECID=TICKER=MSFT FILE=manual. If an object is found (decision box 205) then it will be used. Otherwise, if no object is found in decision box 205, then a new object is created (step 219). If more than one object is found in decision box 207, then the objects are merged (step 223). In any case, the attributes of the object are updated in step 209 using tag-value pairs from database 109 and all possible keys are extracted (step 211) from the attributes of the object. This is done by trying all key sets as defined in the class. For each key set, check that all tags appear as attributes of the object and assign a value taken from the object's attribute to form a key. If a tag has more than one value, as an attribute of the object, then generate all combinations as different keys.

Returning to the previous example, in step 211, it is recognized that the manual line contains two different keys to a Holding object: one is from the HIDX tag and the other from the ACCTID tag and from the implicit Asset tag (which was generated earlier using the SECID tag), all possible keys are extracted (step 211). Finally the two different keys are identified as pointing to the same object since both keys were taken from the same manual line. If no key is found in the object (decision box 221), then the object is discarded. Otherwise, if a key is found in the object, in step 215, the object is put in object data base 117 using the keys. For each of the object's attributes as defined in the class, all values that appear in the line are appended (step 215) to the values assigned to the attribute, making sure that each value appears only once. At this point, the line is made to refer back to the object. The class name is added as a tag to the line and assigned to the object as its value. In our example, the pair Asset={SECID=TICKER=MSFT} is implicitly added (step 113) to the manual line in database 109 since the manual line contains enough information to point to that Asset object.

According to an embodiment of the present invention, in process 20 in order to have a tag used in a key being a name of another class of objects (e.g. Asset is a tag used inside a key to Holding), the other class should have been already been processed by algorithm 20. This can be arranged, for example, by iterating over the classes in a specific order (for example, first over Asset then over Holding) and verifying that the relation between classes does not have loops.

Furthermore, when merging (step 223) objects into one object, all lines and all objects (key tag or attribute) referring to one of the old objects should be updated to refer to the new merged object.

In the following example we want to find the index of all holdings of MICROSOFT CP (there may be more than one holding if the same Asset is held in different accounts):
HIDX!GET Holding={Asset={SECNAME="MICROSOFT CP"}} using the recursive nature of the { . . . } operator. We first search for lines that include SECNAME="MICROSOFT CP" from these lines we pick the value assigned to the Asset tag (if any at all), in this case the values are Asset objects. Next we look for all lines in which one of the above Asset objects appeared and from these lines we pick the Holding objects. Finally we go over all lines that contain one of these Holding objects and look up the value assigned to the HIDX tag.

The following query will get us all SECID for which we forgot to enter an ASSETCLASS:
SECID!GET Asset!={ASSETCLASS?}

The query ASSETCLASS? finds all lines that do have ASSETCLASS defined. The value of the Asset tag is taken from those lines and next we perform a query Asset!= . . . which looks for lines that have an Asset tag but that does not match any of these values.

Object's Attributes

We have seen how lines can point to objects using keys that are the value assigned to set of tags. Several lines are thus grouped as belonging to one object. In essence the group of lines is the object's content. Each tag value pair appearing in any of the lines of the group is an attribute of the object. The values assigned to each tag in all the lines in the group are the values of the attribute of the object. The values taken from different lines form a new binding together of tag-value pairs at the object level. An object can be represented as a new line in database 109 by merging all the tag-value pairs from all the lines in the group. The binding together of information in an object does not affect the lines themselves. On the contrary, a line may point to several objects (as long as they are from different classes.) The original line content is never modified and therefore the fact that the same line may be part of several line groups, each belonging to a different object from a different class, should not interfere.

In the previous examples we have seen how to extract attributes directly from the lines using an appropriate query. For example, an Asset security name (SECNAME) and currency can be extracted with the filter: SECNAME!GET CURRENCY!GET Asset= . . . A drawback of this approach is that a query is performed whenever you want to retrieve an attribute. Another drawback is that you are required to keep track of all relevant attribute tags of each class of objects. According to an embodiment of the present invention, for each class, all attributes (tags) that are of interest are specified and then stored (or cached) in the object in database 117 as a copy of values taken from the group of lines in which the object appeared. For example:

```
class Asset(Obj):
    stags=['AIDX']              # Numerical index to asset
                                  (none-OFX)
    stags+=['CURRENCY']         # Currency used in UNITPRICE
    stags+=['ORIGCURRENCY']     # Currency in which the asset is
                                  traded.
                                # May be important for tax and correlation
```

-continued

```
    stags+=['COUNTRY']          # Country in which the investment is
                                  traded.
                                # May be important for tax
    mtags=['SECID']             # Asset's unique names.
                                # Usually a unique name has a structure
                                # <domain>=<name>
                                # Examples for domains:
                                  TICKER,CUSIP,ISIN,TASE
    mtags+=['SECNAME']          # Asset's non unique names.
    mtags+=['ASSETCLASS',
    'MEMO']
    ktags=[['SECID']]
```

In this example we have listed in the lists stags and mtags all the attributes of interest for an object from the class Asset. The attributes in mtags can have any number of different values or none at all. The attributes in stags are expected to have at most one unique value. The lines in data base 109 may of course accidentally have multiple values even for an stags attribute. For example, COUNTRY=USA and COUNTRY="UNITED STATES", as follows:
SECID=TICKER=F         SECID=CUSIP=34537086
    FILE=manual
COUNTRY=USA SECID=TICKER=F FILE=manual
COUNTRY="UNITED                              STATES"
    SECID=CUSIP=34537086 FILE=manual In the spirit of this invention, conflicts of this sort preferably concern a content verification tool, 123, running over an existing data-base and are preferably ignored when importing the lines to data-base 109. So putting an attribute in either stags or mtags is just an indicator for such a tool and not part of the basic infrastructure. An advantage of having a private copy of the attributes values in each object is that a tool 121 can edit them, without affecting at the same time the original lines of database 109. For example, a subsequent tool can decide that COUNTRY=USA is the preferred value and erase COUNTRY="UNITED STATES" from the object. The entire attribute content of an object can be printed:
    PRINT=FULL Asset!GET SECID=TICKER=F
which results, for example, with:
SECID=CUSIP=345370860 TICKER=F
CURRENCY=USD
COUNTRY=USA
SECNAME="FORD MOTOR CO"
ASSETCLASS=STOCK In conclusion, adjusting the model is performed by changing the class definition or by creating new classes by adding/updating lines in database 109 with class-object pairs. The same "flat line" infrastructure is used both for inputting data, generating objects and performing queries.

Object Filtering

Consider the following class definition of a single historic price of an asset:
class PriceHistory(Obj):
    stags=['Asset','DTASOF','UNITPRICE']
    keys=[['Asset','DTASOF','UNITPRICE?']]

According to an embodiment of the present invention the last tag in the key set, UNITPRICE?, behaves as a filter when testing if the line contains the other tags in the key set. The filter's task is to ensure that a PriceHistory object will appear only in lines that have a UNITPRICE tag regardless of the value assigned to it. The value assigned to this tag is not needed to create a key but the filtering is needed because the key set ['Asset','DTASOF'] may appear in lines containing other historical facts about the asset.

Next consider the following class:
```
class TaxYear(Obj):
    stags=['TAXYEAR','DTSTART','DTEND']
    keys=[['TAXYEAR'],['DTTRADE<@DTEND
        DTTRADE>=@DTSTART']]
```
applied to the following line of database 109:
TAXYEAR=2005                    DTEND=20060101
    DTSTART=20050101
This will create a new TaxYear object using the first key set: TAXYEAR=2005 and with attributes DTEND=20060101 DTSTART=20050101. Next consider testing if this object appears in the line: DTTRADE=20050202
Here the second key set is expanded to be
DTTRADE>20060101 DTTRADE<=20050101 and will subsequently
match the line. As a final example, consider the following definition of an expense class:
```
class ExpenseCategory(Obj):
    stags=['CATEGORY','MEMOFILTER','TRNTYPEFIL-
        TER']
    keys=[['CATEGORY'],['MEMO/@MEMOFILTER',
        'TRNTYPE=@TRNTYPEFILTER']]
```
which is applied to the line:
CATEGORY="Office Supply" MEMOFILTER=Staples TRNTYPEFILTER=DEBIT
to define that a line will be categorized as "Office Supply" if it contains TRNTYPE=DEBIT and if one of the values assigned to the MEMO tag in the line contains the sub-string "Staples". For example:
TRNTYPE=DEBIT                   UNITS=−120.50
    DTSETTLE=20070131 MEMO="Staples NY"

Algorithm for Finding Object

Figure 3:
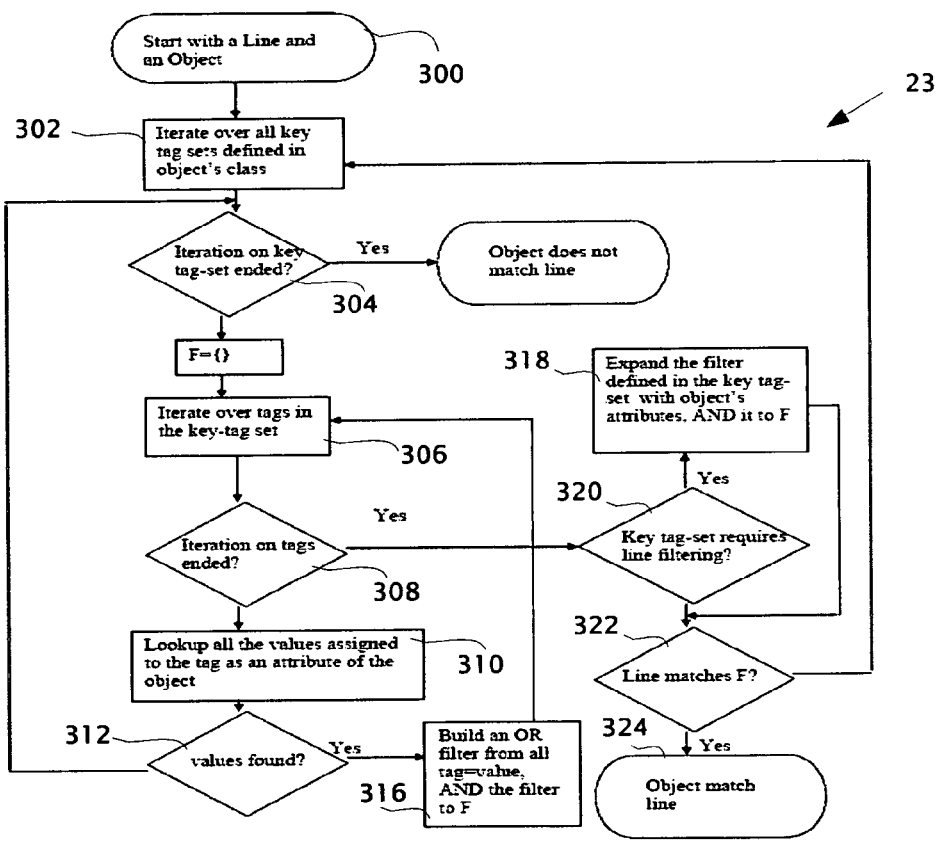
FIG. 3. is a flow diagram of algorithm for finding objects that match a line, according to an embodiment of the present invention.

Reference is now made to FIG. 3, a flow diagram of algorithm 23 for finding objects that match a line, according to an embodiment of the present invention. We have seen before that a query can be performed on an entire data base of lines by defining a filter (F) and applying it to each of the lines and checking which line matches the filter; the same matching mechanism can be used to test if an object matches a line. Starting (step 300) with a line and an object, first an iteration (step 302) is performed over all key tag sets defined in the object's class. If first iteration (step 302) ends (decision box 304) without matching any of the tag sets to the line, then the object does not match the line. A key tag-set is matched to a line as follows: a query filter (F) is initialized as empty ({ }) and a second iteration (step 306) is performed over the tags in each key-tag set of first iteration (step 302). During the second iteration (step 306), all the values are looked up (step 310) which are assigned to the tags as attributes of the object. If values are found (decision box 312) then an OR filter is built from all tag-value pairs (and added to F). When the second iteration ends (decision box 308), a check is made whether any of the key-sets requires line filtering (decision box 320). If the key tag-set requires line filtering, the line filtering is expanded (step 318) using values found in the object's attributes. Only then can a decision be made (decision block 322) that the object was found (step 324) in the line by checking if the filter (F) matches the line.

Building Tools

The query that allowed us to retrieve the entire content of an object (e.g., Asset!GET SECID=TICKER=F) can be used in a programmatic interface to retrieve an Asset object. This object will have all the above attributes set in it and these attributes can be naturally accessed as with any regular object. This simplifies the task of writing tools, object fixing tools 121 and reporting tools 123 (in FIG. 1.) Writing tools are easily implemented for instance in Python programming language.

Some example of possible tools 121, 123:

Check consistency of the data-base

Merge transactions from different sources. The result of this merger can be new artificial or computed objects. A possible shortcut to creating these objects is to create artificial lines marked with FILE=MERGED. These artificial lines are added to data-base 109 and as with any other line cause the model to be updated and new objects to form. These artificial lines should be erased every time there is a model change.

Compute statement information. This tool uses the merged transactions to compute the number of units in each holding after each transaction takes place. Again the results are kept as temporary MERGED lines.

Generate a report on the data-base content. This tool uses the merged information to compute the latest estimated values of the holdings in a portfolio. The output can be sent to the user or stored in a spreadsheet file. A user can supply a filter that is used to limit the lines on which the report is generated. This can be used in several ways:

Take statements that are older than a specific date, effectively generating a report for a past date.

Filter all Holdings from a specific bank account or group of accounts.

Limit the report to a specific ASSETCLASS and using this information to see the distribution of holdings.

All of the above can be combined together

Export the data-base back to OFX. With this tool and an appropriate filter it is possible to generate an OFX file of the merged information and export the file into commercial software.

Advantages of Embodiments of the Present Invention

The framework allows processing of information coming from different sources by converting them to flat lines. The use of flat lines keeps as much information as possible in the original form in which it was received from the financial institutions. Since queries are performed on the flat lines themselves it is possible to retrieve the original lines and if necessary it is easy to go back to the original line in the original incoming statement that came from the financial institution. The framework resolves conflicts and ambiguities after the data is input by developing tools that resolve the conflicts and ambiguities. In comparison, in a prior art system which converts all incoming data into fixed tables based on a given underlying model, the direct relation to the original document may be lost.

While the invention has been described with respect to a limited number of embodiments, it will be appreciated that many variations, modifications and other applications of the invention may be made.

What is claimed is:

1. A computer-implemented method for managing data, the method being performed in a computer system, the method comprising the steps of:

(a) storing the data in a data base including a plurality of flat lines, wherein each of said flat lines includes at least one value of the data and at least one tag associated with said at least one value, forming a plurality of tag-value pairs, wherein the said data in at least one said flat-line was transformed from an external file; and (b) scanning said flat lines, creating an object of a user defined class, wherein said class specifies a subset including one or more tags selected from said at least one tag, wherein at least one of said flat lines points to said object if a portion of the tag-value pairs of said at least one flat line includes all the one or more tags of said subset; and wherein during said scanning a plurality of objects are created wherein only one of said objects is desired by a user, further comprising the step of:

(c) inserting additional flat lines into said data base wherein at least one of said inserted flat lines contains a plurality of alternative ways, through said subset of tags, of pointing to said desired object, and the object as individually identified by the alternative ways is taken to be the same object; and wherein said scanning is performed based on a model said class defined by a user, further comprising the step of:

(d) changing said class by said user to a second class; and (e) according to said second class, creating new objects by second scanning said flat lines.

* * * * *